July 13, 1965 A. C. BARR 3,194,424

DISPOSABLE INFANT FEEDING PACKAGE

Filed Feb. 26, 1964

INVENTOR.
Arthur C. Barr
BY McCanna, Morsbach & Pillote
Att'y

3,194,424
DISPOSABLE INFANT FEEDING PACKAGE
Arthur C. Barr, 111 King St., Madison 3, Wis.
Filed Feb. 26, 1964, Ser. No. 347,492
10 Claims. (Cl. 215—11)

This invention relates in general to improved containers for holding food, and more particularly to an improved container such as a bottle for storing under sterile conditions a single ration of a prepared formula of liquid infant food, the bottle being equipped before sterilizing and storage with a nipple, permitting the infant to be fed the ration directly from the container equipped with a sterilized nipple.

This invention is especially useful in the feeding of infants in hospitals, for example, in the maternity wards where extreme precautions are taken to give the infants the maximum protection against possible infection and also against mistakes in the preparation and distribution of food to them. The invention is not limited, however, to hospital use, for its advantages will be greatly appreciated in the home and among travelers when infants are fed from previously prepared bottles of formulated food.

Another object of the invention is to provide an improved container for storing under sterile conditions a ration of liquid infant food, the container being provided with a nipple from which the liquid formula is excluded prior to actual service from the container, without the necessity of maintaining the container upright.

Another object of the invention is to provide a container for a ration of liquid infant food which may be sterilized before and after filling the container, and especially sterilized afterward when the container is sealed, the container, however, being provided with a nipple from which the liquid formula is excluded during sterilizing and storage by means of a closure or sealing member through which a passage may conveniently be opened to admit the fluid to the nipple at the time it is desired to serve the contents of the bottle.

Another object of the invention to provide a container having a liquid food disposed therein, a nipple attached to the top of the container through which the bottle contents may be fed to an infant and a sealing member so disposed as to exclude the liquid contents from the nipple during and after sterilization of the container and its contents, the sealing member being so constructed as to adequately withstand normally expected external and internal pressures during sterilization and subsequently, yet being rupturable by the application of a moderate amount of externally applied pressure when it is desired to permit the liquid contents to flow into the nipple.

Other objects and advantages of the invention will be particularly described hereinafter or will become apparent from a perusual of this specification, in which a preferred embodiment of the invention is shown and described.

Figure 1:
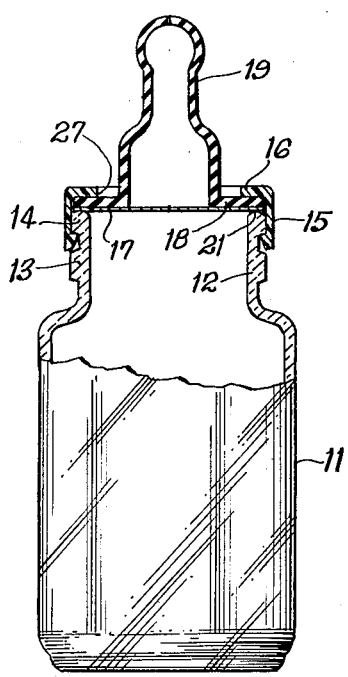
FIGURE 1 is a central vertical sectional view through a portion of a bottle constructed and equipped in accordance with this invention.

Referring further to the drawing, there is shown in FIG. 1 in full size, a typical bottle 11 in which a single three ounce ration of liquid food for an infant may be disposed and sterilized. Of course, the invention is not limited to the particular size of the bottle. Preferably, the bottle will be of the wide mouth variety, as shown, having a neck 12 on the periphery of which may be provided circular ribs 13 and 14 such as are suitable for the application of a cap which may be snapped on in place, as shown, or molded in place if desired. Alternatively, a screw type cap may be employed, in which case conventional spiral threads will be provided on the outside of the neck 12 and cooperating threads on the cap.

In its preferred form, the cap has a downwardly extending flange 15, the lower edge of which is engageable with the upper rib by which it is locked in place. An inwardly extending narrow annular flange 16 serves the purpose of clamping the sealing disk 17 and the laterally extending flange 18 of a rubber nipple 19 securely upon the upper edge 21 of the bottle mouth.

In order that the container and its contents may receive the highest possible sterilization protection it is advisable that they be subjected when filled and fully assembled, to conventional or otherwise adequate sterilization practices such as autoclaving. In such a procedure, the bottle may be subjected to superior external pressures, or the contents may achieve an internal pressure at some time during the process greater than the external pressure. Therefore, the sealing or closure member 17, coated if necessary and which has the function of excluding the liquid contents from access to the nipple until immediately prior to use, must be capable of withstanding such pressures, and yet be capable of being ruptured conveniently when communication with the nipple is later desired.

For this purpose, one form of a sealing member found to be satisfactory is a thin metal disk such as aluminum provided with intersecting slits such as 22 and 23 throughout the central portion of the disk, but not extending to its periphery. Such slits may be provided in any suitable manner, for example, by the use of a rotating cutting blade or by a shearing action, which in either case will provide actual cuts or slits through the disk which are very narrow and capable of being sealed subsequently with a coating or plastic film 24 compatible with food and sanitary requirements and strong and dense enough to close the slits adequately to withstand internal or external pressures, yet being such a coating or film that it too may be ruptured by the same action which ruptures, deforms or perforates the disk.

Preferably, the coating 24 comprises a relatively soft plastic such that it will effectively act as a seal between the metal disk and the mouth of the bottle, though a separate gasket may be employed if desired.

Figure 5:
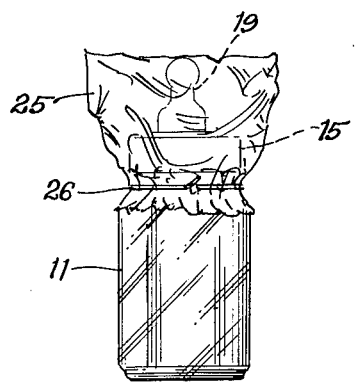
FIG. 5 is a side elevational view of a bottle equipped in accordance with this invention and showing a transparent flexible plastic hood enclosing and protecting the upper portion of the bottle assembly, yet permitting the sealing member to be ruptured before removal of the hood.
Figure 4:
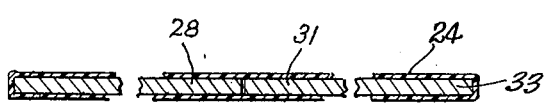
FIG. 4 is a sectional view on line 4—4 of FIG. 3, showing the disk with a sealing and strengthening coating covering the entire surface.

As a further contribution to assuring that the container and its contents are held or maintained in a sterile condition prior to use, it is preferred that a very flexible plastic hood which may be in the shape of a pouch 25 be drawn down over the bottle and over the nipple, and sealed or tied securely, preferably near the bottom of the neck 12, as shown at 26 in FIGURE 5.

Obviously, the bottle with its hood in place, may be warmed preparatory to feeding, if desired, without disturbing its sterile condition.

Figure 2:
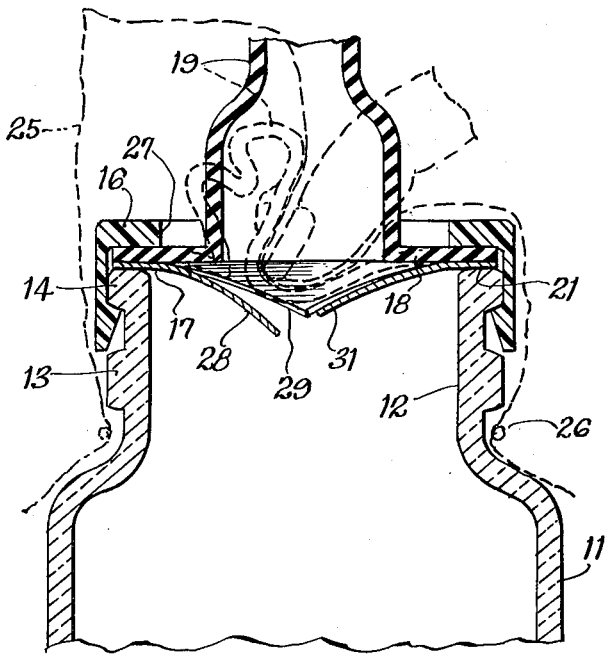
FIG. 2 is a sectional view on a larger scale of the upper portion of the bottle assembly, showing the sealing member ruptured, to permit flow of the liquid contents of the bottle into the nipple when the bottle is later inverted. This figure further shows how the sealing member may be ruptured merely by application of finger pressure.
Figure 3:
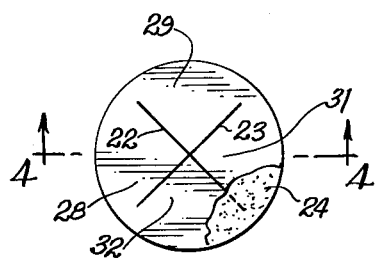
FIG. 3 is a plan view of the sealing member or disk.

A convenient method of rupturing the disk to put the liquid in communication with the nipple 19 is as follows and is shown in FIG. 2. The nurse or other person who may be about to give the bottle to an infant, leaves the hood 25 in place as shown, and applies the tip of one finger to the hood and nipple, forcing the latter downwardly against the disk through the circular aperture 27 in the cap, applying just enough pressure to deform the disk and rupture it along the slit lines, for example, in the manner illustrated in FIGURE 2. When at least one of the portions 28, 29, 31 and 32 of the disk have assumed approximately one of the positions shown in FIG. 2, the bottle is thus unsealed.

It is to be noted that in this manner, without disturbing the sterile condition of the bottle contents or the nipple itself, the bottle seal has been broken. After discarding the hood, the bottle may be given to the infant, the liquid readily flowing to the nipple and air entering the bottle in a normal manner.

Instead of cutting slits in the disk 17 as shown, the disk may be weakened in some manner other than by actually cutting slits through it.

Grooves or closely spaced small perforations may be provided and subsequently sealed, if necessary, with a coating or plastic film 24. If the slits, grooves or holes are quite narrow or small, the film may easily extend across them, effectively filling them and rendering this sealing member when the film has hardened, capable of withstanding the internal or external pressures which may be encountered during the sterilization process. In some cases the plastic film material, while fluid, may extend into or through the slits or perforations but there will be no objection to this as the disk preferably is coated on all sides and edges for complete assurance of making the disk leak proof, to prevent contact of the liquid food with the metal disk, and to enable the weakened disk better able to withstand autoclaving pressures.

Figure 6:
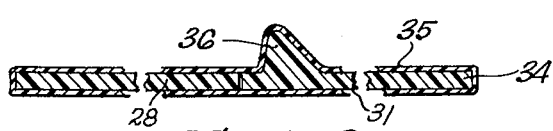
FIG. 6 is a diametrical sectional view of a sealing member made of a plastic such as Bakelite and covered with a plastic film.

Disks formed of material other than metal may be employed, the requirement being that they be capable of withstanding the pressures encountered in sterilizing and be capable of rupture at moderate pressures such as can be readily applied by a simple hand tool or finger as shown in FIG. 2. For example, FIG. 6 shows disk 34 of synthetic resin such as "Bakelite" which can be ruptured in the manner described. This is covered with a film or coating 35 of a soft resin such as a polystyrene which acts as a seal at the bottle mouth but also acts to retain any disk fragments which may be produced upon rupture of the disk.

If desired the disk 34 may be formed with one or more protrusions such as indicated at 36 positioned to project upwardly into the nipple to a position more conveniently contacted by the user to effect rupture of the disk in the manner heretofore described.

One of the great advantages of the invention herein disclosed is the fact that bottles of food may be prepared in advance in a food factory not connected with a hospital, sterilized under suitable conditions, preferably while covered with the hoods, and then refrigerated and delivered to the hospitals for use. In view of the rapidly increasing costs of hospital space, equipment and labor, preparation and storage in a hospital of sterilized infant rations would not be comparable in economy to prepackaged factory production. In most cases, it will be an added convenience and overall economy if the bottle and all of its accessories constitute a throw away item after use.

While a preferred embodiment of the invention is shown herein and described it should be understood that the invention is susceptible of considerable modification and variation without departing from the spirit and scope of the invention defined in the appended claims.

I claim:

1. In combination, a bottle, a nursing nipple having an upstanding central portion and a bottom laterally extending peripheral flange dimensioned for overlying the top margin of the bottle mouth, a disk-shaped sealing member having a peripheral margin underlying the aforesaid peripheral flange and having a central weakened portion readily rupturable by pressure applied thereagainst by pressing downwardly on the nipple, said weakened portion before assembly of the combination being covered with a leak-proof coating readily rupturable simultaneously with the rupturing of said weakened portion, a bottle cap having a top wall with a central aperture surrounding said upstanding nipple portion, and cooperating means on the bottle and cap for locking the cap in position to press said peripheral portions of the nipple and member in sealing engagement with the bottle mouth.

2. A combination in accordance with claim 1, with the addition of a removable thin plastic film hood loosely covering the nipple and the sealed end of the bottle and sealed to the bottle side, said hood being flexible to permit application of finger pressure to the nipple for rupturing the sealing member before removal of the hood.

3. In combination, a bottle, an imperforate sealing member having a peripheral portion engaged with the top margin of the bottle mouth and having a central portion weakened by a plurality of narrow slits, said weakened portion being coated and sealed with an imperforate plastic film subsequent to the making of the slits and sealing them against leakage during and after sterilization of the bottle and its contents, a nursing nipple having a laterally extending peripheral flange overlying the peripheral portion of the sealing member, a bottle cap having a centrally apertured top wall and an annular flange engaging the peripheral flange of the nipple, and means for locking the cap on the bottle with its flange compressing the nipple and sealing member for sealing the bottle.

4. In combination, a container for storing in sterile condition a single ration of a prepared formula of liquid infant food, and imperforate sealing member seated upon and closing the mouth of the container, said member having a central portion so constructed and arranged as to be rendered perforate by pressure applied thereagainst by pressing downwardly on a nursing nipple, said nursing nipple having a laterally extending bottom flange to cover said member, and means for compressibly locking the nipple and sealing member in sealing relation with the container.

5. In combination, a bottle for storing in sterile condition a single ration of a prepared formula of liquid infant food, an imperforate sealing member seated upon and closing the mouth of the bottle, a nursing nipple having a bottom flange laterally extending to cover said member, a cap having a top annular horizontal flange framing a central aperture through which the nipple rises, means on the bottle neck and cap for locking the cap on the bottle with the cap flange compressibly seating the nipple and said member upon the bottle mouth, said member having a portion initially perforate and deformable but coated and sealed subsequently with a rupturable film rendering it imperforate, said portion being constructed and arranged to be rendered perforate by pressure applied thereto upon the nipple acting through said aperture.

6. In combination, a bottle, a metallic sealing member having a peripheral portion overlying the top margin of the bottle mouth, the central portion of said member being a planar portion perforated by narrow apertures which may be further widened by moderate downwardly applied pressure thereagainst, a plastic film coating and covering said central portion thereby rendering it imperforate and leak proof, said film being rupturable by the same aforesaid pressure, a nursing nipple disposed on top of said member, and means securing said member in sealing relation to the bottle mouth.

7. In combination, a bottle adapted for storing in sealed and sterile condition a ration of a liquid infant food, an imperforate sealing member seated upon and closing the mouth of the bottle, a nursing nipple superposed on said member and having a bottom flange laterally extending to cover the peripheral portions of said member, a cap having a top annular flange framing a central aperture through which the nipple rises, means on the bottle neck and cap adapted for locking the cap on the bottle with the cap flange compressibly seating the nipple and said member upon said bottle mouth, said member having a central portion constructed and arranged to be rendered perforate by pressure applied to press the nipple downwardly upon said central portion until said member is ruptured and a portion thereof laterally displaced, and an integral upwardly extending projection on said central portion positioned for receiving said pressure.

8. The combination in accordance with claim 6 with the addition thereto of a detachable pouch enclosing the bottle top and nipple flexible enough to permit pressure to be applied through the pouch and nipple for rupturing said member and film.

9. In combination, a container, and imperforate sealing member having a peripheral margin engaged substantially with the top margin of the container, said sealing member having a container spanning area with a portion thereof weakened by a plurality of narrow slits, said weakened portion being initially perforate and deformable but coated and sealed wtih an imperforate film subsequent to the making of the slits and sealing them against leakage, said weakened portion and film being adapted to being ruptured by pressure applied thereagainst and laterally displacing a portion thereof, a nursing nipple overlying said sealing member, and means for securing said nursing nipple and sealing member in sealing relation to the container.

10. In combination, a container having a supply of liquid therein, an imperforate sealing member closing the mouth of the container and in sealing relation thereto, said sealing member having a portion thereof weakened by scoring, said scoring being so arranged as to allow said sealing member to be rendered perforate by finger pressure applied thereto, said pressure rupturing the sealing member along the line of said scoring and laterally displacing a portion of said sealing member, said displaced portion allowing free flow of the liquid from the container when said container is tipped into a pouring position, a nursing nipple overlying said sealing member, and means for attaching the sealing member and nursing nipple to the container mouth.

References Cited by the Examiner
UNITED STATES PATENTS
2,628,910  2/53  Horan _____ 215—11

FRANKLIN T. GARRETT, *Primary Examiner.*